US008947329B2

(12) United States Patent
Choi

(10) Patent No.: US 8,947,329 B2
(45) Date of Patent: Feb. 3, 2015

(54) OLED DISPLAY WHEREIN THE STORAGE CAPACITOR IS CHARGED BY A SECOND POWER SOURCE ACCORDING TO INVERTED EMISSION CONTROL SIGNALS

(75) Inventor: Sang-Moo Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 846 days.

(21) Appl. No.: 12/846,678

(22) Filed: Jul. 29, 2010

(65) Prior Publication Data

US 2011/0227889 A1 Sep. 22, 2011

(30) Foreign Application Priority Data

Mar. 17, 2010 (KR) ........................ 10-2010-0023762

(51) Int. Cl.
*G09G 3/30* (2006.01)
*G06F 3/038* (2013.01)
(Continued)

(52) U.S. Cl.
CPC ...... *G09G 3/3233* (2013.01); *G09G 2300/0842* (2013.01); *G09G 2300/0861* (2013.01); *G09G 2320/0223* (2013.01); *G09G 2300/0819* (2013.01)
USPC ............................................ 345/77; 345/211

(58) Field of Classification Search
CPC ......... G09G 3/3208–3/3291; G09G 2300/043; G09G 2300/0465; G09G 2300/0819; G09G 2300/0842; G09G 2300/0861; G09G 2300/0876; G09G 2320/0223; G09G 2320/0233; G09G 2320/043–2320/046
USPC ......... 345/76–83, 204–215; 315/169.3–169.4
See application file for complete search history.

(56) References Cited

U.S. PATENT DOCUMENTS 7,057,588 B2 6/2006 Asano et al.
7,355,459 B2 4/2008 Miyazawa
(Continued)

FOREIGN PATENT DOCUMENTS

KR 10-2005-0005646 A 1/2005
KR 10-20050090861 9/2005
(Continued)

OTHER PUBLICATIONS

Office action issued Mar. 26, 2012 in corresponding Korean Patent Application No. 10-2010-0023762, 1pg.
(Continued)

*Primary Examiner* — Chanh Nguyen
*Assistant Examiner* — Navin Lingaraju
(74) *Attorney, Agent, or Firm* — Christie, Parker & Hale, LLP

(57) ABSTRACT

An organic light emitting display includes a scan driver for driving scan lines and emission control lines, a data driver for driving data lines, a display unit including pixels at crossing regions of scan lines and data lines, first power source lines coupled to a first power source configured to supply a first voltage and coupled to pixels in columns, horizontal power source lines extending in a direction parallel with scan lines and coupled to pixels in rows, and a second power source line coupled to the horizontal power source lines and to a second power source configured to supply the same voltage as the first power source, each of the pixels being configured to store a voltage corresponding to voltages of the second power source and a data signal and to control an amount of current that flows from the first power source in accordance with the stored voltage.

15 Claims, 11 Drawing Sheets

(51) Int. Cl.

*G09G 5/00* (2006.01)

*G09G 3/32* (2006.01)

(56) References Cited

U.S. PATENT DOCUMENTS

| | | | | |
|---|---|---|---|---|
| 2004/0095338 | A1 | 5/2004 | Miyazawa | |
| 2004/0239661 | A1 | 12/2004 | Jo | |
| 2005/0017934 | A1 | 1/2005 | Chung et al. | |
| 2005/0110730 | A1 | 5/2005 | Kim et al. | |
| 2006/0044235 | A1* | 3/2006 | Lee et al. | 345/82 |
| 2006/0077138 | A1* | 4/2006 | Kim | 345/76 |
| 2006/0103611 | A1 | 5/2006 | Choi | |
| 2006/0248420 | A1* | 11/2006 | Jeong | 714/727 |
| 2006/0290617 | A1* | 12/2006 | Miyazawa | 345/76 |
| 2007/0040772 | A1* | 2/2007 | Kim | 345/76 |
| 2008/0142827 | A1* | 6/2008 | Choi et al. | 257/98 |
| 2008/0143704 | A1* | 6/2008 | Choi | 345/212 |
| 2008/0150846 | A1* | 6/2008 | Chung | 345/80 |
| 2010/0007651 | A1* | 1/2010 | Kim | 345/213 |
| 2010/0128014 | A1* | 5/2010 | Choi | 345/211 |
| 2010/0188391 | A1* | 7/2010 | Kim | 345/212 |
| 2012/0038683 | A1* | 2/2012 | Park et al. | 345/690 |

FOREIGN PATENT DOCUMENTS

| | | | | |
|---|---|---|---|---|
| KR | 10-2006-0078427 | | 7/2006 | |
| KR | 10-2006-0135749 | | 12/2006 | |
| KR | 10-0719663 | B1 * | 5/2007 | G09G 3/36 |
| KR | 10-0815756 | B1 | 1/2008 | |
| KR | 10-2008-0060967 | | 7/2008 | |
| KR | 10-0846969 | | 7/2008 | |
| KR | 10-2008-0084017 | | 9/2008 | |
| KR | 10-0873078 | B1 | 12/2008 | |
| KR | 10-2009-0042714 | | 4/2009 | |
| KR | 10-2009-0096893 | | 9/2009 | |

OTHER PUBLICATIONS

U.S. Office action dated Feb. 15, 2013, for cross reference U.S. Appl. No. 12/969,484, (18 pages).

U.S. Office action dated May 28, 2013, for cross reference U.S. Appl. No. 12/969,484, (17 pages).

KIPO Office action dated Nov. 22, 2011 for Korean Patent application 10-2010-0043506, (1 page).

Korean Patent Abstracts, Publication No. 10-2008-0091926, dated Oct. 15, 2008, corresponding to Korean Patent 10-0873078, listed above.

* cited by examiner

OLED DISPLAY WHEREIN THE STORAGE CAPACITOR IS CHARGED BY A SECOND POWER SOURCE ACCORDING TO INVERTED EMISSION CONTROL SIGNALS

CROSS-REFERENCE TO RELATED APPLICATION

This application claims priority to and the benefit of Korean Patent Application No. 10-2010-0023762, filed on Mar. 17, 2010, in the Korean Intellectual Property Office, the entire content of which is incorporated herein by reference.

BACKGROUND

1. Field

The following description relates to an organic light emitting display, and more particularly, to an organic light emitting display capable of displaying an image with desired brightness.

2. Description of Related Art

Recently, various flat panel displays (FPDs) that are lighter in weight and smaller in volume than comparable cathode ray tubes (CRTs) have been developed. The types of FPDs include liquid crystal displays (LCDs), field emission displays (FEDs), plasma display panels (PDPs), and organic light emitting displays.

Among the FPDs, an organic light emitting display is capable of displaying an image using organic light emitting diodes (OLED) that generate light through the re-combination of electrons and holes. The organic light emitting display has relatively high response speed and relatively low power consumption.

The organic light emitting display includes pixels at crossing regions of data lines and scan lines, a data driver for supplying data signals to the data lines, and a scan driver for supplying scan signals to the scan lines.

The scan driver sequentially supplies the scan signals to the scan lines. The data driver supplies the data signals to the data lines in synchronization with the scan signals.

The pixels are selected when the scan signals are supplied to the scan lines to receive the data signals from the data lines. A pixel that receives a data signal charges (stores) a voltage corresponding to a difference between the voltage of the data signal and the voltage of a first power source in a storage capacitor. Then, the pixel supplies current corresponding to the voltage charged (stored) in the storage capacitor from the first power source to a second power source via the OLED to generate light with a brightness (e.g., a predetermined brightness).

However, due to the voltage drop of the first power source, a desired voltage may not be charged in the storage capacitor. Therefore, an image with desired brightness may not be displayed. In more detail, the first power source supplies a current (e.g., a predetermined current) to the OLED and a voltage drop (e.g., a predetermined voltage drop) is generated in accordance with the amount of current supplied to the OLED. In this case, the desired voltage may not be charged in the storage capacitor for charging the voltage corresponding to the difference voltage between the first power source and the data signal.

In addition, when the data signal is supplied to one terminal of the storage capacitor, the voltage of the first power source coupled to the other terminal of the storage capacitor may temporarily change. Therefore, picture quality may be further deteriorated. In particular, such a problem is severe in a high resolution and large panel where a plurality of storage capacitors are formed in units of horizontal lines (or rows).

SUMMARY

Accordingly, one or more aspects of one or more embodiments of the present invention are directed to an organic light emitting display capable of displaying an image with desired brightness.

In order to achieve the foregoing and/or other aspects of the present invention, according to one embodiment of the present invention, there is provided an organic light emitting display, including a scan driver for driving a plurality of scan lines and a plurality of emission control lines, a data driver for driving a plurality of data lines, a display unit including pixels at crossing regions of the scan lines and the data lines, a plurality of first power source lines coupled to a first power source configured to supply a first voltage and coupled to the pixels in units of vertical lines (or columns), a plurality of horizontal power source lines extending in a direction parallel with the scan lines and coupled to the pixels in rows, and a second power source line coupled to the horizontal power source lines and coupled to a second power source and configured to supply the same voltage as the first power source, wherein each of the pixels is configured to store a voltage corresponding to the voltage of the second power source and the voltage of a data signal and is configured to control an amount of current that flows from the first power source in accordance with the stored voltage.

The organic light emitting display may further include a plurality of resistors, each of the resistors being coupled between a respective horizontal power source line of the horizontal power source lines and the second power source line. The scan driver may be configured to sequentially supply a plurality of scan signals to the scan lines and to sequentially supply a plurality of emission control signals to the emission control lines. The scan driver may be further configured to supply an emission control signal of the emission control signals to an ith (i is a natural number) emission control line of the emission control lines that overlaps with a scan signal of the scan signals supplied to an ith scan line of the scan lines. The scan driver may be further configured to supply inverted emission control signals generated by inverting the emission control signals to a plurality of inverted emission control lines extending in a direction parallel with the emission control lines. The organic light emitting display may further include a plurality of first switching elements, each of the first switching elements being coupled between a respective horizontal power source line of the horizontal power source lines and the second power source line.

The scan driver may be further configured to turn on a corresponding first switching element of the first switching elements in a period where a storage capacitor included in each of the pixels is charged and is configured to turn off the corresponding first switching element in other periods. The first switching element of the plurality of first switching elements in an ith (i is a natural number) horizontal line (or row) may be configured to be turned on when a corresponding inverted emission control signal of the inverted emission control signals is supplied to an ith inverted emission control line of the inverted emission control lines and to be turned off when the corresponding inverted emission control signal is not supplied to the ith inverted emission control line. Each of the pixels in an ith (i is a natural number) row of the rows may include an organic light emitting diode (OLED), a pixel circuit for controlling the amount of current supplied to the OLED, a first transistor coupled between a first node, the first node being a common node between the pixel circuit and the first power source line and an ith horizontal power source line of the horizontal power source lines, the first transistor being configured to be turned off when the emission control signal is supplied to the ith emission control line, and a storage capacitor coupled between the pixel circuit and the ith horizontal power source line.

The scan driver may be configured to turn off the first transistor in a period where the storage capacitor is charged and to turn on the first transistor in other periods. Each of the pixels in the ith row may further include a second transistor coupled between the first node and the pixel circuit and configured to be turned off when the emission control signal is supplied to the ith emission control line. The pixel circuit may include a third transistor coupled between the first node and the OLED and having a gate electrode coupled to one terminal of the storage capacitor, and a fourth transistor coupled between a corresponding data line of the data lines and one terminal of the storage capacitor and configured to be turned on when the scan signal is supplied to the ith scan line. The second power source may have a lower wiring line resistance than that of the horizontal power source line and that of the first power source line. The organic light emitting display may further include at least one third power source line coupled to the second power source and extending in a direction parallel with the data lines in the display unit region. The organic light emitting display may further include a plurality of second switching elements, each of the second switching elements being coupled between a corresponding horizontal power source line of the horizontal power source lines and the at least one third power source line. The second switching element of the second switching elements in an ith (i is a natural number) row of the rows may be configured to be turned on when the corresponding scan signal of the scan signals is supplied to an ith scan line of the scan lines. The organic light emitting display may further include a plurality of third switching elements, each of the third switching elements being coupled between a corresponding horizontal power source line of the horizontal power source lines and the at least one third power source line. The third switching element of the third switching elements in the ith (i is a natural number) row of the rows may be configured to be turned on when a corresponding scan signal of the scan signals is supplied to an (i−1)th scan line of the scan lines.

In organic light emitting displays according to embodiments of the present invention, a voltage is charged (stored) in the storage capacitor using the second power source and a data signal regardless of the first power source (e.g., the voltage of the first power source) for supplying current to the OLED. In this case, a desired voltage may be charged (stored) in the storage capacitor so that an image with desired (or more uniform) brightness may be displayed. In addition, according to one embodiment of the present invention, a third power source line may be added to be coupled to the horizontal power source lines and the second power source is additionally supplied to the horizontal power source lines using the third power source line. Therefore, it is possible to prevent or reduce changes in the voltage of the second power source.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
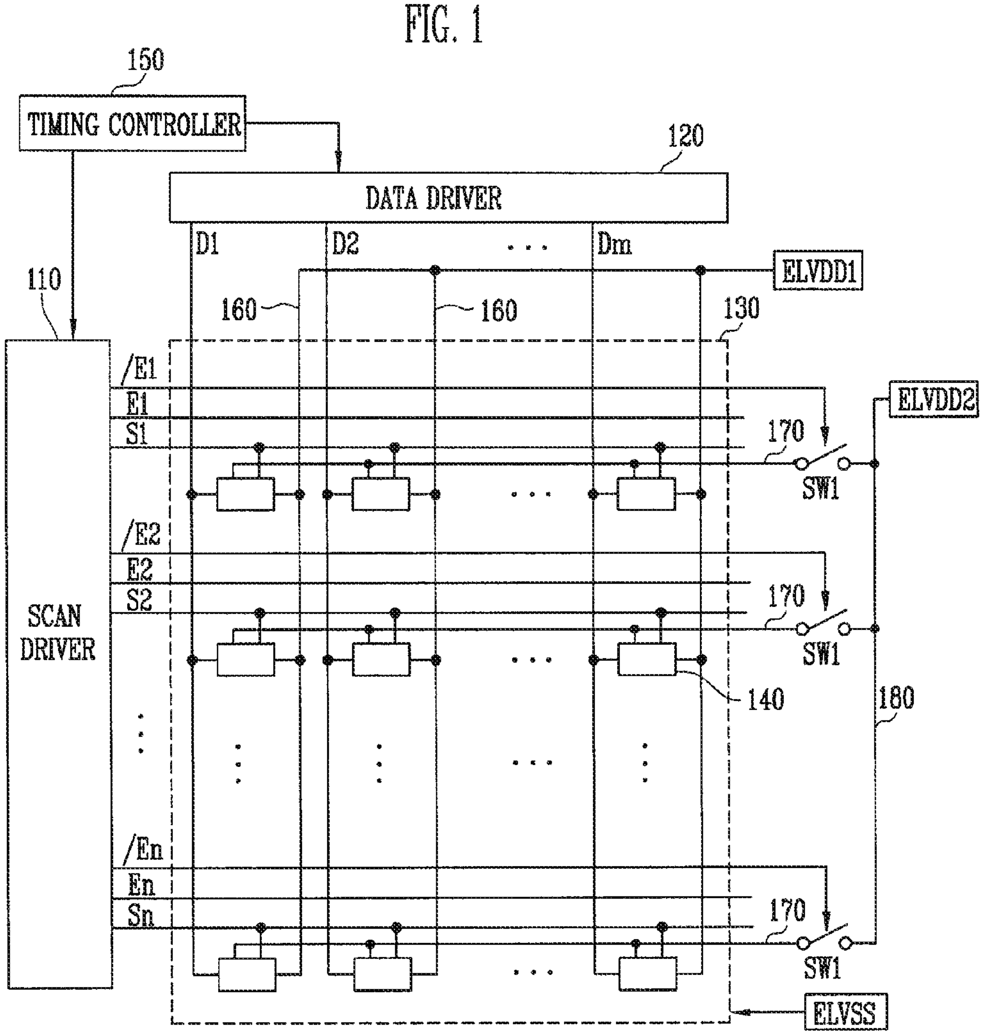
FIG. 1 is a schematic view illustrating an organic light emitting display according to a first embodiment of the present invention.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via one or more third elements. Further, some of the elements that are not essential to the complete understanding of the invention are omitted for clarity. Also, like reference numerals refer to like elements throughout.

Hereinafter, exemplary embodiments by which those skilled in the art can easily perform the present invention will be described in more detail with reference to FIGS. 1 to 13.

FIG. 1 is a schematic view illustrating an organic light emitting display according to a first embodiment of the present invention.

Referring to FIG. 1, the organic light emitting display according to the first embodiment of the present invention includes a display unit (or a pixel unit) 130 having pixels 140 located at crossing regions of scan lines S1 to Sn and data lines D1 to Dm, a scan driver 110 for driving (e.g., for providing scan signals, emission control signals, and inverted emission control signals to) the scan lines S1 to Sn, emission control lines E1 to En, and inverted emission control lines /E1 to /En, a data driver 120 for driving (e.g., providing data signals to) the data lines D1 to Dm, and a timing controller 150 for controlling the scan driver 110 and the data driver 120.

In addition, the organic light emitting display according to one embodiment of the present invention includes first power source lines 160 extending in a direction parallel with the data lines D1 to Dm in a plurality of vertical lines (or columns) to be coupled to the pixels 140, horizontal power source lines 170 extending in a direction parallel with the scan lines S1 to Sn to be coupled to the pixels 140 in a plurality of horizontal lines (or rows), a second power source line 180 formed outside the display unit 130 to be coupled to a second power source ELVDD2, and first switching elements SW1, each of the first switching elements SW1 being formed between a respective horizontal power source line of the horizontal power source lines 170 and the second power source line 180.

The scan driver 110 sequentially supplies scan signals to the scan lines S1 to Sn and sequentially supplies emission control signals to the emission control lines E1 to En. In addition, the scan driver 110 sequentially supplies inverted emission control signals to the inverted emission control lines /E1 to /En.

The scan signals have a voltage (for example, in a low level) at which transistors included in the pixel 140 may be turned on. The emission control signals are set to have a voltage (for example, in a high level) at which the transistors included in the pixel 140 may be turned off. The inverted emission control signals are obtained by inverting the polarities of the emission control signals using an inverter and are set to have a voltage at which the transistors may be turned on.

According to embodiments of the present invention, the widths of the emission control signals and the scan signals may be set to vary in accordance with the structure of the pixel 140. For example, the emission control signal supplied to the ith (i is a natural number) emission control line Ei may be supplied to overlap with the scan signal supplied to the ith scan line Si. The inversion emission control signal supplied to the ith inverted emission control line /Ei is generated by inverting the emission control signal supplied to the ith emission control line Ei. The inverted emission control signal supplied to the ith inverted emission control line /Ei is different from the emission control signal supplied to the ith emission control line Ei only in that the polarity of the inverted emission control signal supplied to the ith inverted emission control line /Ei is inverted and is set to be supplied at the same point of time and to have the same width as the emission control signal supplied to the ith emission control line Ei.

The data driver 120 supplies data signals to the data lines D1 to Dm when the scan signals are supplied.

The timing controller 150 controls the scan driver 110 and the data driver 120. In addition, the timing controller 150 realigns data supplied from the outside and transmits the data to the data driver 120.

The first power source lines 160 are coupled to the pixels 140 in units of vertical lines (or columns). The first power source lines 160 are coupled to a first power source ELVDD1 and supply the voltage of the first power source ELVDD1 to the pixels 140. The first power source ELVDD1 supplies a current (e.g., a predetermined current) to the OLEDs in the pixels 140.

The second power source line 180 is formed outside the display unit 130 and is coupled to the second power source ELVDD2. The second power source ELVDD2 is set to supply the same voltage as the first power source ELVDD1. The second power source ELVDD2 controls the voltage charged (stored) in the storage capacitor included in each of the pixels 140.

The horizontal power source lines 170 are coupled to the pixels 140 in units of horizontal lines (or rows). The horizontal power source lines 170 receive the voltage of the second power source ELVDD2 when the respective first switching elements SW1 are turned on.

Each first switching element SW1 of the first switching elements is formed between a corresponding horizontal power line of the horizontal power source lines 170 and the second power source line 180. The first switching element SW1 is turned on when the inverted emission control signal is supplied to electrically couple the corresponding horizontal power source line 170 to the second power source line 180.

The display unit 130 includes the pixels 140 located at crossing regions of the scan lines S1 to Sn and the data lines D1 to Dm. The pixels 140 charge (store) a voltage corresponding to a voltage difference between the voltage of a data signal of the data signals and the voltage of the second power source ELVDD2 and control the amount of current that flows from the first power source ELVDD1 to a third power source ELVSS via the OLED in accordance with the charged (stored) voltage.

Figure 2:
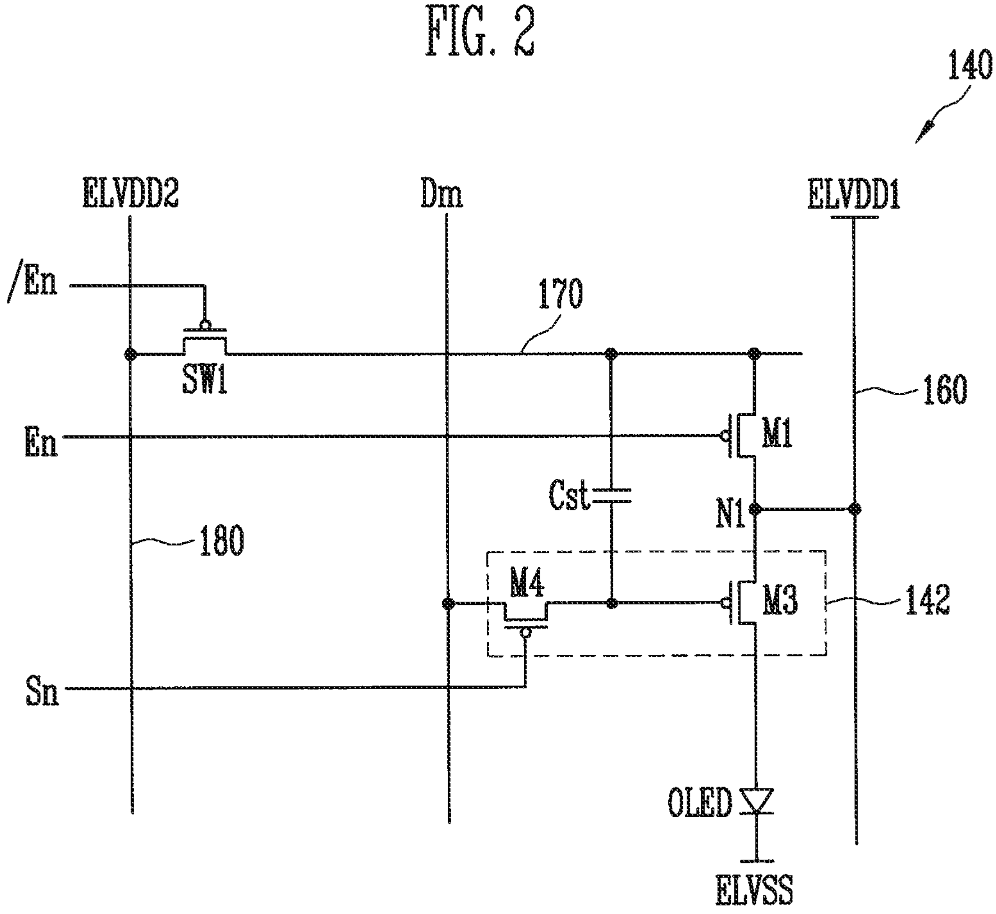
FIG. 2 is a circuit diagram illustrating a pixel which may be used in the embodiment of FIG. 1.

FIG. 2 is a circuit diagram illustrating a pixel which may be used with the embodiment of FIG. 1.

Referring to FIG. 2, a pixel 140 according to one embodiment of the present invention includes an OLED, a pixel circuit 142 for controlling the amount of current supplied to the OLED, a first transistor M1 coupled between the pixel circuit 142 and a horizontal power source line 170, and a storage capacitor Cst.

The anode electrode of the OLED is coupled to the pixel circuit 142, and the cathode electrode of the OLED is coupled to the third power source ELVSS. The OLED generates light with a brightness (e.g., a predetermined brightness) in accordance with the current supplied from the pixel circuit 142.

The first electrode of the first transistor M1 is coupled to a first node N1 that is a common terminal of a first power source line 160 and the pixel circuit 142, and the second electrode of the first transistor M1 is coupled to the horizontal power source line 170. The gate electrode of the first transistor M1 is coupled to the emission control line En. The first transistor M1 is turned off when an emission control signal is supplied to the emission control line En and is turned on in other cases.

The storage capacitor Cst is coupled between the horizontal power source line 170 and the pixel circuit 142. The storage capacitor Cst charges (stores) a voltage corresponding to the data signal supplied from the pixel circuit 142 and the second power source ELVDD2 supplied from the horizontal power source line 170.

The pixel circuit 142 controls the amount of current that flows from the first power source ELVDD1 to the third power source ELVSS via the OLED in accordance with the voltage charged (stored) in the storage capacitor Cst. Therefore, the pixel circuit 142 includes a third transistor M3 and a fourth transistor M4.

The first electrode of the third transistor (or a driving transistor) M3 is coupled to the first node N1, and the second electrode of the third transistor M3 is coupled to the anode electrode of the OLED. The gate electrode of the third transistor M3 is coupled to one terminal of the storage capacitor Cst. The third transistor M3 controls the amount of current supplied to the OLED in accordance with the voltage charged (stored) in the storage capacitor Cst.

The first electrode of the fourth transistor M4 is coupled to the data line Dm, and the second electrode of the fourth transistor M4 is coupled to one terminal of the storage capacitor Cst. The gate electrode of the fourth transistor M4 is coupled to the scan line Sn. The fourth transistor M4 is turned on when a scan signal is supplied to the scan line Sn to electrically couple the data line Dm to one terminal of the storage capacitor Cst.

According to embodiments of the present invention, the pixel circuit 142 may be realized by various types of suitable circuits. That is, according to embodiments of the present invention, the pixel circuit 142 may be realized by various types of suitable circuits that may supply current to the OLED in accordance with the voltage charged (stored) in the storage capacitor Cst.

Figure 3:
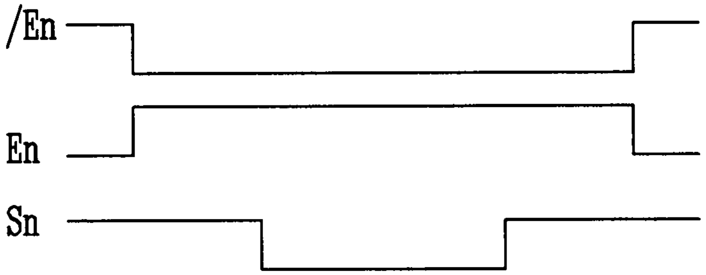
FIG. 3 is a waveform diagram illustrating a method of driving the pixel of FIG. 2.

FIG. 3 is a waveform diagram illustrating a method of driving the pixel of FIG. 2 according to one embodiment of the present invention.

Referring to FIG. 3, an emission control signal is supplied to the emission control line En, and the inverted emission control signal is supplied to the inverted emission control line /En.

When the emission control signal is supplied to the emission control line En, the first transistor M1 is turned off. When the inverted emission control signal is supplied to the inverted emission control line /En, the first switching element SW1 is turned on. When the first switching element SW1 is turned on, the second power source line 180 and the horizontal power source line 170 are electrically coupled to each other. In this case, the voltage of the second power source ELVDD2 is supplied to the horizontal power source line 170.

Then, a scan signal is supplied to the scan line Sn so that the fourth transistor M4 is turned on. When the fourth transistor M4 is turned on, a data signal from the data line Dm is supplied to one terminal of the storage capacitor Cst. The storage capacitor Cst charges (stores) a voltage corresponding to a difference between the voltage of the data signal and the voltage of the second power source ELVDD2. The second power source ELVDD2 does not supply current to the OLED. Therefore, a desired voltage is charged (stored) in the storage capacitor Cst.

After the voltage is charged (stored) in the storage capacitor Cst, the supply of the scan signal to the scan line Sn is stopped so that the fourth transistor M4 is turned off. After the fourth transistor M4 is turned off, supply of the emission control signal to the emission control line En is stopped and supply of the inverted emission control signal to the inverted emission control line /En is stopped.

When the supply of the emission control signal to the inverted emission control line /En is stopped, the first switching element SW1 is turned off. When the supply of the emission control signal to the emission control line En is stopped, the first transistor M1 is turned on. When the first transistor M1 is turned on, the horizontal power source line 170 and the first power source line 160 are electrically coupled to each other so that the voltage of the first power source ELVDD1 is supplied to the horizontal power source line 170.

When the voltage of the first power source ELVDD1 is supplied to the horizontal power source line 170, because one terminal of the storage capacitor Cst is floating, the storage capacitor Cst maintains the voltage charged (stored) in a previous period regardless of the voltage of the first power source ELVDD1 supplied to the horizontal power source line 170. The third transistor M3 controls the amount of current that flows from the first power source ELVDD1 to the second power source ELVSS via the OLED in accordance with the voltage charged (stored) in the storage capacitor Cst.

According to embodiments of the present invention, the voltage charged (stored) in the storage capacitor Cst is determined regardless of the first power source ELVDD1 (or the voltage supplied by the first power source ELVDD1) for supplying current to the OLED. That is, according to embodiments of the present invention, the voltage is charged (stored) in the storage capacitor Cst using the second power source ELVDD2 so that an image with desired (or more uniform) brightness may be displayed.

Figure 4:
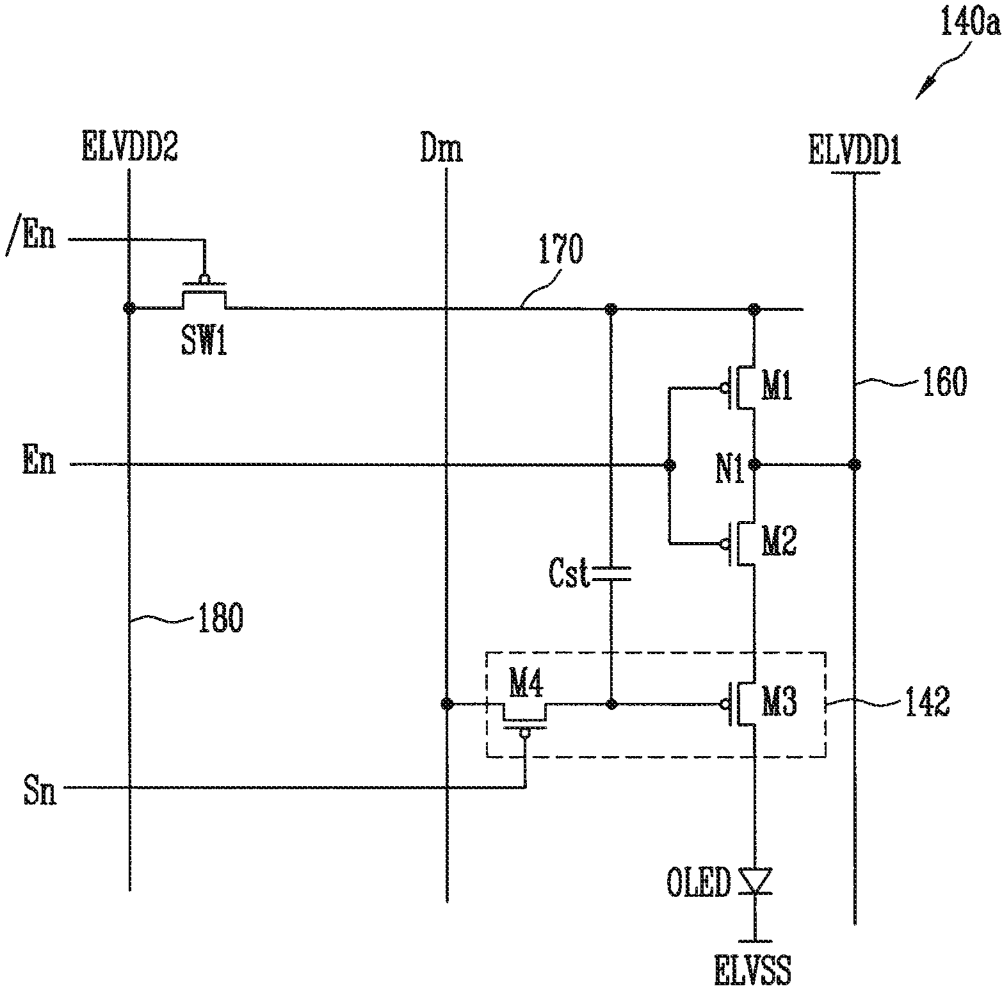
FIG. 4 is a circuit diagram illustrating another pixel which may be used in the embodiment of FIG. 1.

FIG. 4 is a circuit diagram illustrating another pixel which may be used with the embodiment of FIG. 1. In FIG. 4, the same elements as FIG. 2 are denoted by the same reference numerals and detailed description thereof will be omitted.

Referring to FIG. 4, a pixel 140*a* according to another embodiment of the present invention includes a second transistor M2 coupled between a first node N1 and the first electrode of a third transistor M3. The gate electrode of the second transistor M2 is coupled to the emission control line En. The second transistor M2 is turned off when the emission control signal is supplied to the emission control line En and is turned on in other periods. That is, the second transistor M2 blocks electric coupling between the first node N1 and the first electrode of the third transistor M3 in a period where a voltage is charged (stored) in a storage capacitor Cst to prevent (or block) unnecessary current from flowing to the OLED.

Figure 5:
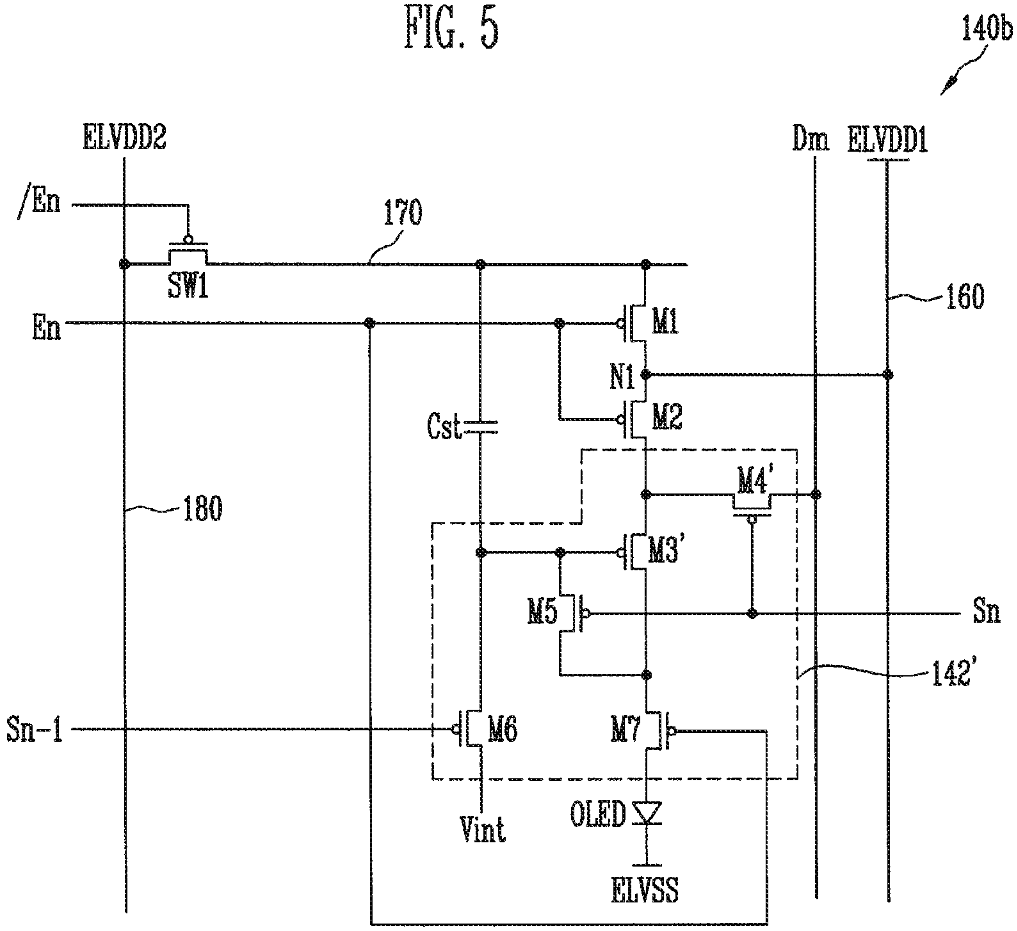
FIG. 5 is a circuit diagram illustrating still another pixel which may be used with the embodiment of FIG. 1.

FIG. 5 is a circuit diagram illustrating still another pixel 140*b* which may be used with the embodiment of FIG. 1. In FIG. 5, the same elements as FIG. 4 are denoted by the same reference numerals and detailed description thereof will be omitted.

Referring to FIG. 5, a pixel circuit 142' according to still another embodiment of the present invention includes five transistors M3', M4', M5, M6, and M7 in order to compensate for the threshold voltage of the third transistor M3'.

The first electrode of the third transistor M3' is coupled to the second electrode of the second transistor M2, and the second electrode of the third transistor M3' is coupled to the first electrode of the seventh transistor M7. The gate electrode of the third transistor M3' is coupled to one terminal of a storage capacitor Cst. The third transistor M3' supplies current in accordance with the voltage charged (stored) in the storage capacitor Cst to the OLED.

The first electrode of a fourth transistor M4' is coupled to the data line Dm, and the second electrode of the fourth transistor M4' is coupled to the first electrode of the third transistor M3'. The gate electrode of the fourth transistor M4' is coupled to the scan line Sn. The fourth transistor M4' is turned on when a scan signal is supplied to the scan line to electrically couple the data line Dm and the first electrode of the third transistor M3' to each other.

The first electrode of the fifth transistor M5 is coupled to the second electrode of the third transistor M3', and the second electrode of the fifth transistor M5 is coupled to the gate electrode of the third transistor M3'. The gate electrode of the fifth transistor M5 is coupled to the scan line Sn. The fifth transistor M5 is turned on when the scan signal is supplied to the scan line Sn so that the third transistor M3' is diode-connected.

The first electrode of the sixth transistor M6 is coupled to one terminal of the storage capacitor Cst, and the second electrode of the sixth transistor M6 is coupled to an initialization power source Vint. The gate electrode of the sixth transistor M6 is coupled to the (n−1)th scan line Sn−1. The sixth transistor M6 is turned on when a scan signal is supplied to the (n−1)th scan line Sn−1 to supply the voltage of the initialization power source Vint to one terminal of the storage capacitor Cst. The voltage of the initialization power source Vint is set to be lower than the voltage (or a lowest voltage) of a data signal.

The first electrode of the seventh transistor M7 is coupled to the second electrode of the third transistor M3', and the second electrode of the seventh transistor M7 is coupled to the anode electrode of the OLED. The gate electrode of the seventh transistor M7 is coupled to the emission control line En. The seventh transistor M7 is turned off when an emission control signal is supplied to the emission control line En and is turned on in other periods.

Figure 6:
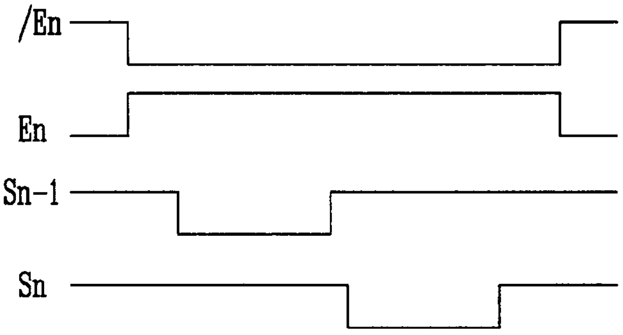
FIG. 6 is a waveform diagram illustrating a method of driving the pixel of FIG. 5.

FIG. 6 is a waveform diagram illustrating a method of driving the pixel of FIG. 5.

Referring to FIG. 6, an emission control signal is supplied to the emission control line En and an inverted emission control signal is supplied to the inverted emission control line /En. When the emission control signal is supplied to the emission control line En, the first transistor M1, the second transistor M2, and the seventh transistor M7 are turned off. When the inverted emission control signal is supplied to the inverted emission control line /En, the first switching element SW1 is turned on. When the first switching element SW1 is turned on, the second power source line 180 and the horizontal power source line 170 are electrically coupled to each other. In this case, the voltage of the second power source ELVDD2 is supplied to the horizontal power source line 170.

Then, the scan signal is supplied to the (n−1)th scan line Sn−1 so that the sixth transistor M6 is turned on. When the sixth transistor M6 is turned on, the voltage of the initialization power source Vint is supplied to one terminal of the storage capacitor Cst and the gate electrode of the third transistor M3' to be initialized.

After the initialization power source Vint is supplied to one terminal of the storage capacitor Cst and to the gate electrode of the third transistor M3', the scan signal is supplied to the nth scan line Sn so that the fourth transistor M4' and the fifth transistor M5 are turned on. When the fourth transistor M4' is turned on, the data signal from the data line Dm is supplied to the first electrode of the third transistor M3'. Because the voltage of the initialization power source Vint supplied to the gate electrode of the third transistor M3' is initialized, the data signal is supplied to one terminal of the storage capacitor Cst via the third transistor M3', which is diode-connected. In this case, the storage capacitor Cst charges (stores) a voltage corresponding to a difference between the voltage obtained by subtracting the absolute value of the threshold voltage of the third transistor M3' from the voltage of the data signal and the voltage of the second power source ELVDD2.

After the voltage is charged (stored) in the storage capacitor Cst, the supply of the scan signal to the scan line Sn is stopped so that the fourth transistor M4' and the fifth transistor M5 are turned off. In addition, after the fourth transistor M4' and the fifth transistor M5 are turned off, the supply of the emission control signal to the emission control line En is stopped and the supply of the inverted emission control signal to the inverted emission control line /En is stopped.

When the supply of the emission control signal to the inverted emission control line /En is stopped, the first switching element SW1 is turned off. When the supply of the emission control signal to the emission control line En is stopped, the first transistor M1, the second transistor M2, and the seventh transistor M7 are turned on. When the first transistor M1 is turned on, the horizontal power source line 170 and the first power source line 160 are electrically coupled to each other. Therefore, the voltage of the first power source ELVDD1 is supplied to the horizontal power source line 170. When the second transistor M2 is turned on, the first electrode of the third transistor M3 is coupled to the first power source line 160.

When the voltage of the first power source ELVDD1 is supplied to the horizontal power source line 170, because one terminal of the storage capacitor Cst is floating, the storage capacitor Cst maintains the voltage charged (stored) in a previous period regardless of the voltage of the first power source ELVDD1 supplied to the horizontal power source line 170. At this time, the third transistor M3 controls the amount of current that flows from the first power source ELVDD1 to the second power source ELVSS via the OLED in accordance with the voltage charged (stored) in the storage capacitor Cst.

Figure 7:
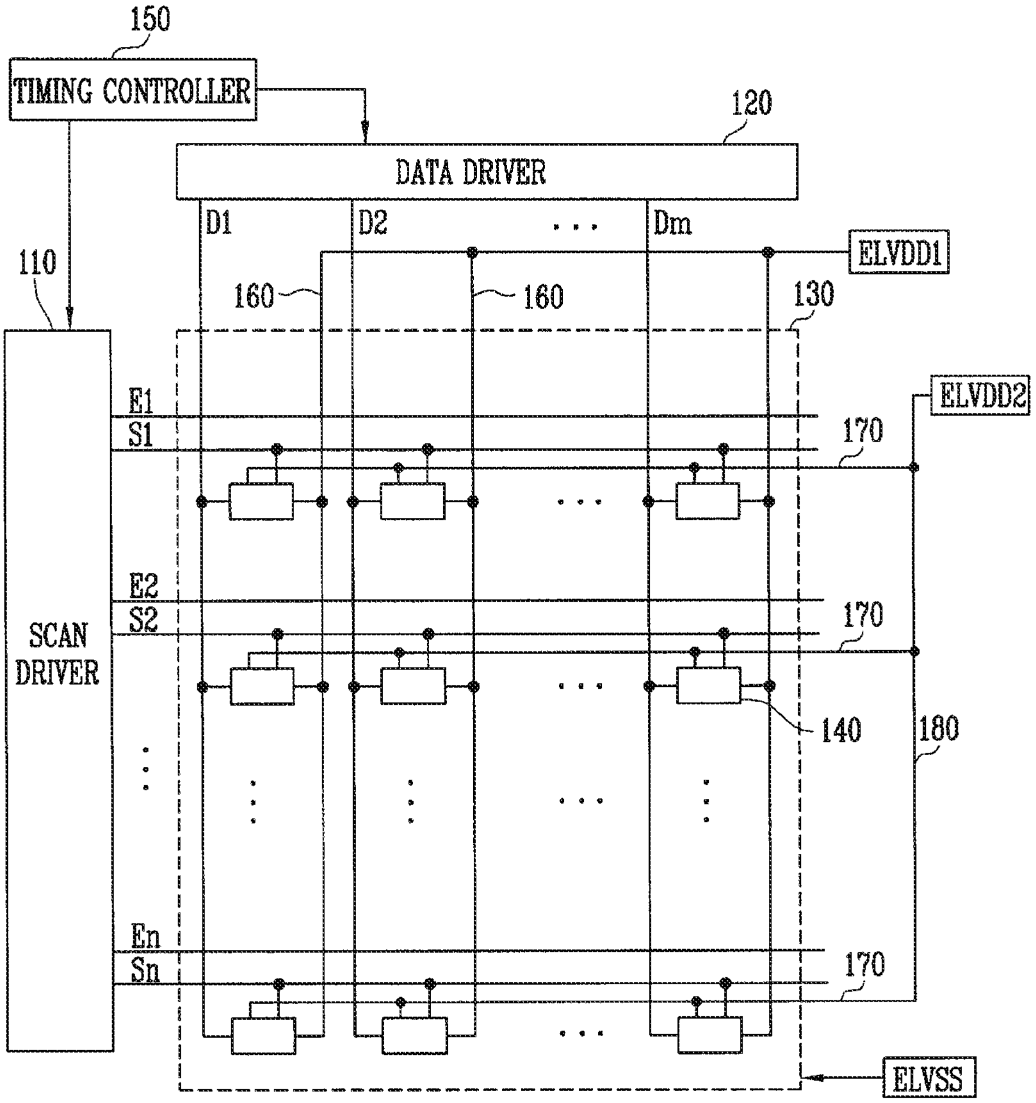
FIG. 7 is a schematic diagram illustrating an organic light emitting display according to a second embodiment of the present invention.

FIG. 7 is a schematic view illustrating an organic light emitting display according to a second embodiment of the present invention. In FIG. 7, elements that are the same as those of FIG. 1 are denoted by the same reference numerals and detailed description thereof will be omitted.

Figure 8:
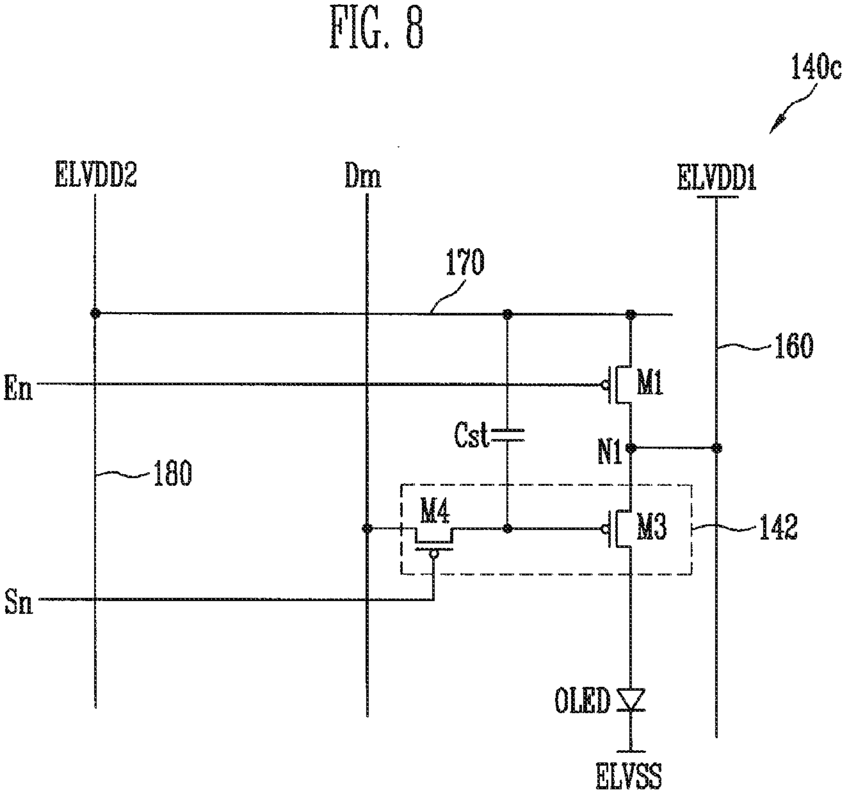
FIG. 8 is a circuit diagram illustrating a pixel which may be used with the embodiment of FIG. 7.

Referring to FIG. 7, in the organic light emitting display according to the second embodiment of the present invention, the second power source line 180 and the horizontal power source line 170 are directly coupled to each other. That is, the first switching element SW1 between the second power source line 180 and the horizontal power source line 170 is removed. In this case, as illustrated in FIG. 8, the pixel 140*c* receives the second power source ELVDD2 from the second power source line 180 via the horizontal power source line 170.

The second power source line 180 is formed to have lower wiring line resistance than the horizontal power source line 170 and the first power source line 160. For example, the second power source line 180 is formed to have a width and/or a thickness larger than the horizontal power source line 170 and the first power source line 160. Because the second power source line 180 is formed on the outline (e.g., at the edges) of the display unit 130, the width and thickness of a wiring line may be freely controlled. When the second power source line 180 is formed to have low wiring line resistance, the voltage drop of the second power source ELVDD2 is reduced or minimized so that a desired voltage may be charged (stored) in the storage capacitor Cst.

Figure 9:
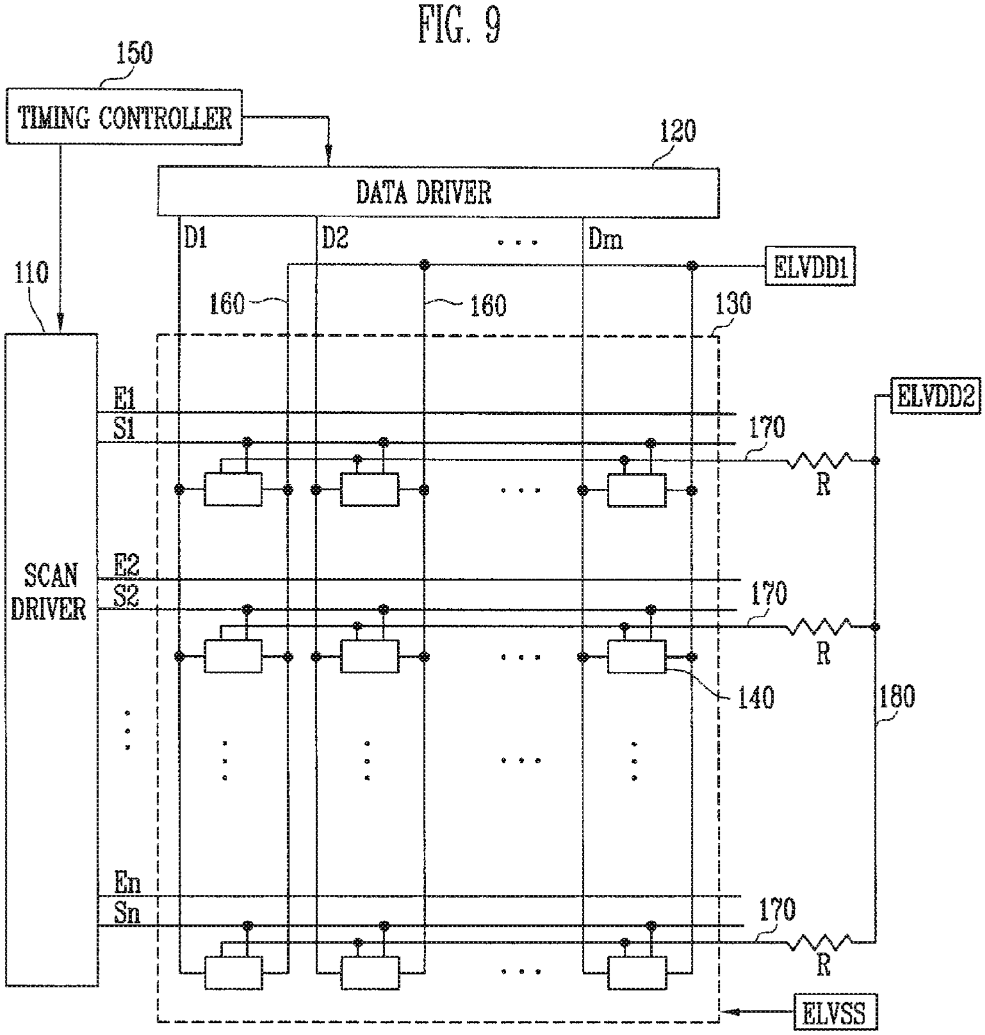
FIG. 9 is a schematic view illustrating an organic light emitting display according to a third embodiment of the present invention.

FIG. 9 is a schematic view illustrating an organic light emitting display according to a third embodiment of the present invention. In FIG. 9, elements that are the same as those of FIG. 1 are denoted by the same reference numerals and detailed description thereof will be omitted.

Figure 10:
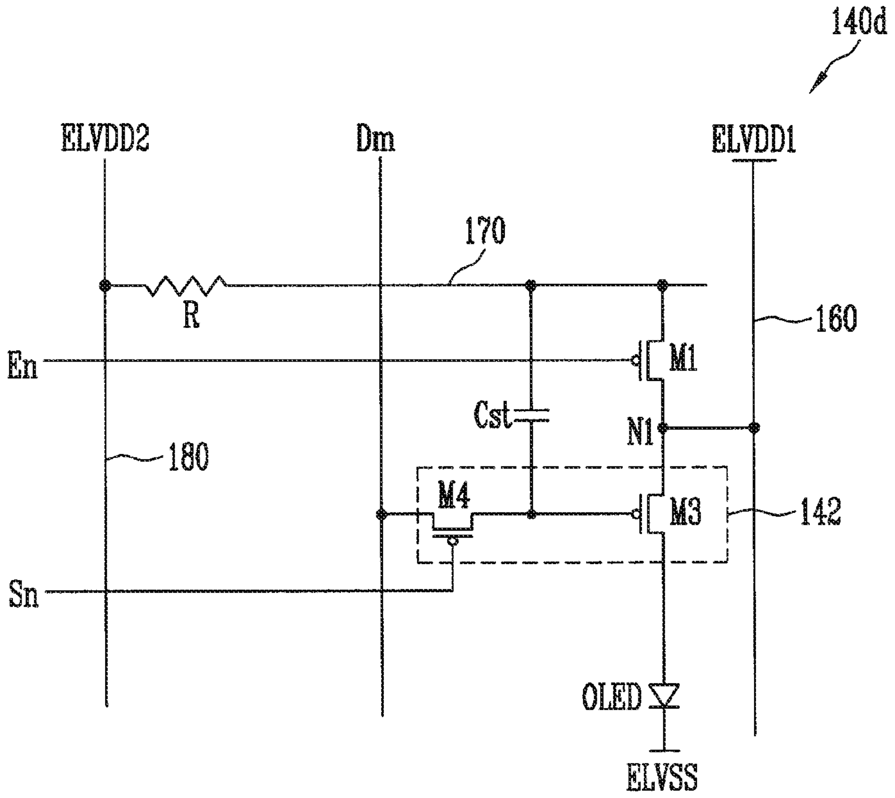
FIG. 10 is a circuit diagram illustrating a pixel which may be used with the embodiment of FIG. 9.

Referring to FIG. 9, in the organic light emitting display according to the third embodiment of the present invention, a resistor R is formed between each of the horizontal power source lines 170 and the second power source line 180. That is, according to the third embodiment of the present invention, the first switching element SW1 illustrated in FIG. 1 is replaced with the resistor R. In this case, as illustrated in FIG. 10, a pixel 140*d* is coupled to the second power source line 180 via the horizontal power source line 170 and the resistor R.

When the resistor R is formed between the horizontal power source line 170 and the second power source line 180, most of the current supplied to the OLED is supplied from the first power source ELVDD1 via the first power source line 160.

Because most of the current that flows to the OLED is supplied from the first power source ELVDD1, the voltage drop of the second power source ELVDD2 is reduced or minimized. Therefore, a desired voltage is charged (stored) in the storage capacitor Cst for charging a voltage corresponding to the second power source ELVDD2 and the data signal so that an image with desired (or more uniform) brightness may be displayed.

Figure 11:
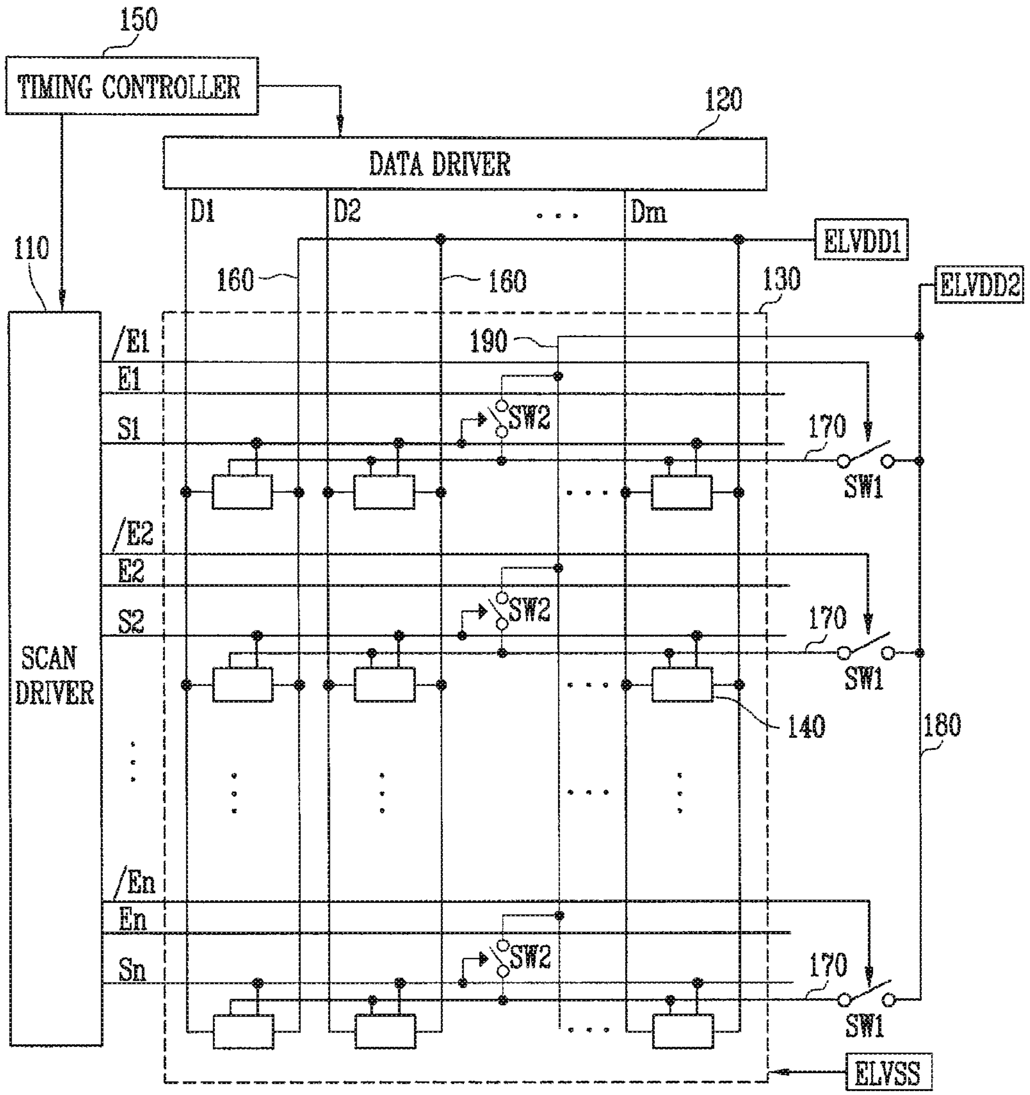
FIG. 11 is a schematic view illustrating an organic light emitting display according to a fourth embodiment of the present invention.

FIG. 11 is a schematic view illustrating an organic light emitting display according to a fourth embodiment of the present invention. In FIG. 11, elements that are the same as elements of FIG. 1 are denoted by the same reference numerals and detailed description thereof will be omitted.

Referring to FIG. 11, the organic light emitting display according to the fourth embodiment of the present invention further includes at least one third power source line 190 that runs parallel with the data line Dm and a plurality of second switching elements SW2 coupled between the horizontal power source lines 170 and the third power source line 190 in the display unit 130.

The third power source line 190 is coupled to the second power source ELVDD2. Each of the second switching elements SW2 formed in every horizontal line (or row) is turned on when a scan signal is supplied from the scan line (one of S1 to Sn) located in the same horizontal line (or row). That is, the second switching element SW2 located in an ith horizontal line (or row) is turned on when a scan signal is supplied to the ith scan line Si to electrically couple the third power source line 190 and the ith horizontal power source line 170 to each other.

According to the fourth embodiment of the present invention, the third power source line 190 and the second switching element SW2 control the horizontal power source line 170 so that the horizontal power source line 170 may stably maintain the voltage of the second power source ELVDD2. In more detail, when the scan signal is supplied to the ith scan line Si, the voltage of the data signal is supplied to each of the pixels 140*e* located in an ith horizontal line (or row). At this time, the horizontal power source line 170 located in the ith horizontal line (or row) changes from the voltage of the second power source ELVDD2 to a voltage (e.g., a predetermined voltage). For example, when the voltage of one terminal of the storage capacitor Cst included in each of the pixels 140*e* changes from the voltage of the initialization power source Vint to the voltage of the data signal, the voltage of the horizontal power source line 170 increases to a voltage higher than the second power source ELVDD2.

When the resistances of the second power source line 180 and the horizontal power source line 170 are low, the voltage of the horizontal power source line 170 that abnormally increases (or varies) is restored to the voltage of the second power source ELVDD2 within a short time. However, as the organic light emitting displays become larger and have higher resolutions, because the wiring line resistances of the second power source line 180 and the horizontal power source line 170 increase and the number of storage capacitors Cst coupled to the horizontal power source line 170 increases, the voltage recovery speed of the horizontal power source line 170 is reduced.

Therefore, according to one embodiment of the present invention, the voltage of the second power source ELVDD2 is additionally supplied to the horizontal power source line 170 using the at least one third power source line 190 formed in the display unit 130. Therefore, the voltage of the horizontal power source line 170 may be maintained as the voltage of the second power source ELVDD2. That is, when the scan signal is supplied to the ith scan line Si, the second switching element SW2 located in the ith horizontal line (or row) is turned on so that the voltage of the horizontal power source line 170 may be stably maintained as the second power source ELVDD2.

Figure 12:
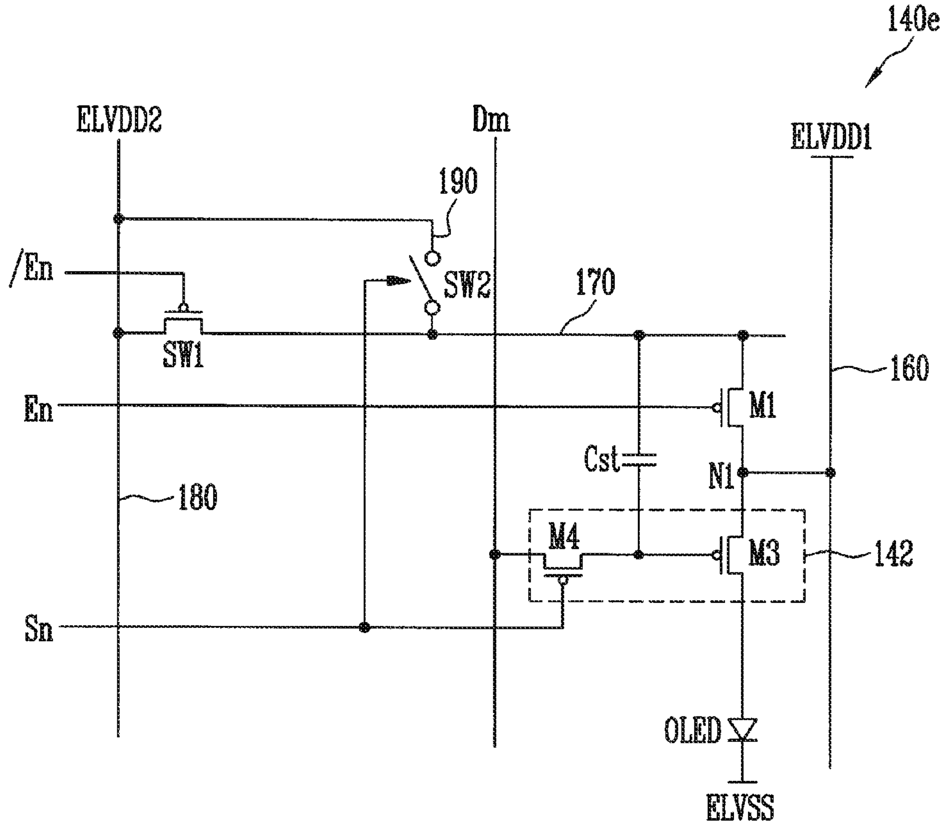
FIG. 12 is a circuit diagram illustrating a pixel which may be used with the embodiment of FIG. 11.

FIG. 12 is a circuit diagram illustrating a pixel which can be used with the embodiment of FIG. 11. In FIG. 12, elements that are the same as those of FIG. 2 are denoted by the same reference numerals and detailed description thereof will be omitted.

Referring to FIG. 12, a pixel 140*e* according to one embodiment of the present invention includes an OLED, a pixel circuit 142 for controlling the amount of current supplied to the OLED, a first transistor M1 and a storage capacitor Cst coupled between the pixel circuit 142 and a horizontal power source line 170.

The horizontal power source line 170 is coupled to a second power source line 180 via a first switching element SW1 and is coupled to a third power source line 190 via a second switching element SW2. The time at which the first switching element SW1 and the second switching element SW2 are turned on overlap.

The operation processes are described in more detail with reference to FIGS. 3 and 12. Referring to FIGS. 3 and 12, the emission control signal is supplied to the emission control line En, and the inverted emission control signal is supplied to the inverted emission control line /En.

When the emission control signal is supplied to the emission control line En, the first transistor M1 is turned off. When the inverted emission control signal is supplied to the inverted emission control line /En, the first switching element SW1 is turned on. When the first switching element SW1 is turned on, the second power source line 180 and the horizontal power source line 170 are electrically coupled to each other. In this case, the voltage of the second power source ELVDD2 is supplied to the horizontal power source line 170.

Then, the scan signal is supplied to the scan line Sn so that a fourth transistor M4 and the second switching element SW2 are turned on. When the second switching element SW2 is turned on, the horizontal power source line 170 and the third power source line 190 are coupled to each other. Therefore, the voltage of the second power source ELVDD2 is additionally supplied to the horizontal power source line 170.

When the fourth transistor is turned on, the data signal from the data line Dm is supplied to one terminal of the storage capacitor Cst. Because the horizontal power source line 170 and the third power source line 190 are additionally coupled to each other, the voltage of the horizontal power source line 170 is stably (or more stably) maintained as the voltage of the second power source ELVDD2. When the data signal is supplied, the storage capacitor Cst charges (stores) a voltage corresponding to a difference between the voltage of the data signal and the voltage of the second power source ELVDD2.

After the voltage is charged (stored) in the storage capacitor Cst, the supply of the scan signal to the scan line Sn is stopped so that the fourth transistor M4 and the second switching element SW2 are turned off. In addition, after the fourth transistor M4 is turned off, the supply of the emission control signal to the emission control line En is stopped, and the supply of the inverted emission control signal to the inverted emission control line /En is stopped.

When the supply of the emission control signal to the inverted emission control line /En is stopped, the first switching element SW1 is turned off. When the supply of the emission control signal to the emission control line En is stopped, the first transistor M1 is turned on. When the first transistor M1 is turned on, the horizontal power source line 170 and a first power source line 160 are electrically coupled to each other so that the voltage of the first power source ELVDD1 is supplied to the horizontal power source line 170.

When the voltage of the first power source ELVDD1 is supplied to the horizontal power source line 170, because one terminal of the storage capacitor Cst is floating, the storage capacitor Cst maintains the voltage charged (stored) in a previous period regardless of the voltage of the first power source ELVDD1 supplied to the horizontal power source line 170. At this time, the third transistor M3 controls the amount of current that flows from the first power source ELVDD to the second power source ELVSS via the OLED in accordance with the voltage charged (stored) in the storage capacitor Cst.

In the embodiment shown in FIG. 11, one second switching element SW2 is formed in every horizontal line (or row). However, embodiments of the present invention are not limited to the above. For example, in the pixel illustrated in FIG. 5, when the scan signal is supplied to the (n−1)th scan line Sn−1, the voltage of the horizontal power source line 170 may be reduced by the initialization power source Vint.

Figure 13:
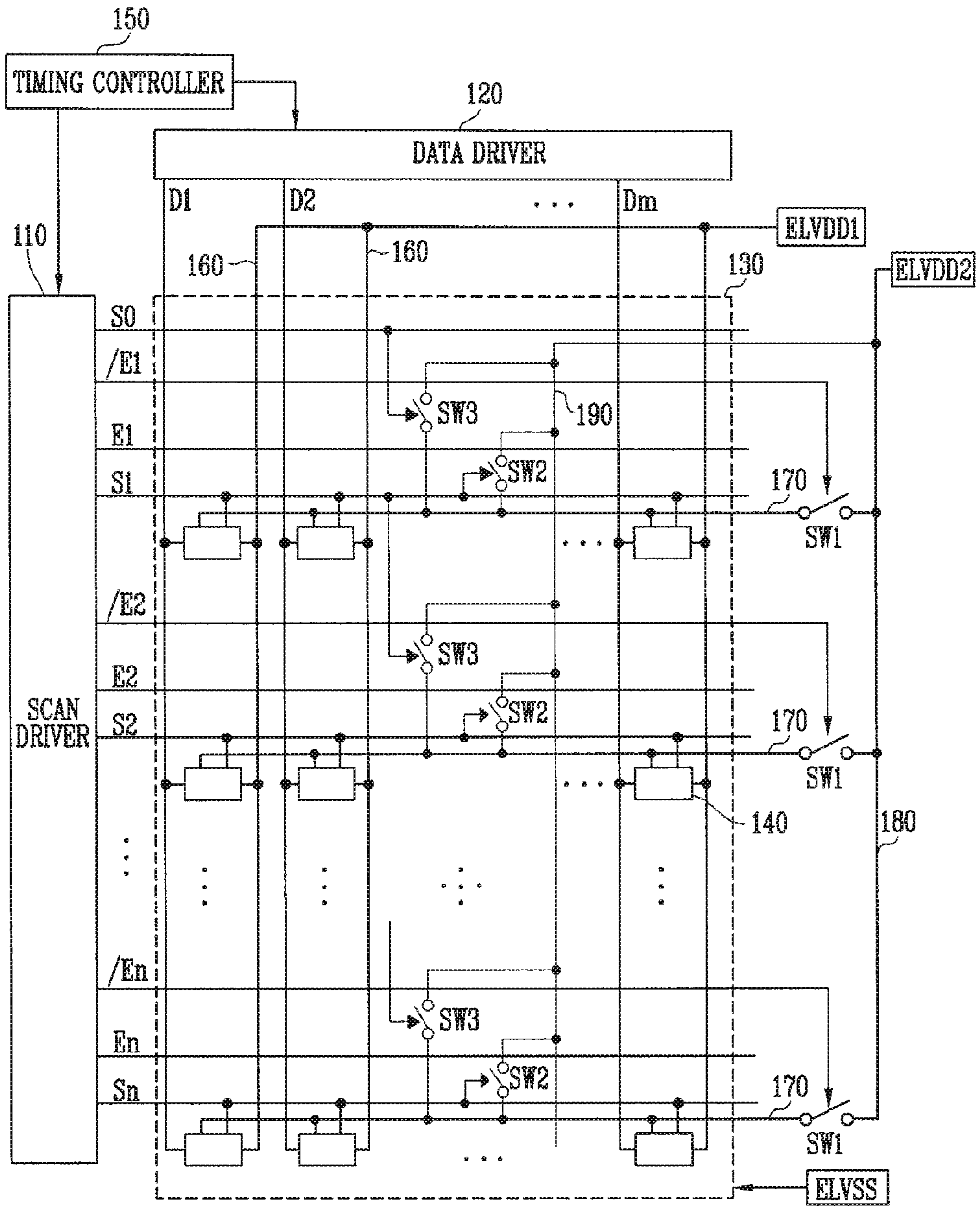
FIG. 13 is a schematic view illustrating an organic light emitting display according to a fifth embodiment of the present invention.

Therefore, according to one embodiment of the present invention as illustrated in FIG. 13, a third switching element SW3 coupled between each of the horizontal power source lines 170 and the third power source line 190 may be further provided. The third switching element SW3 located in the ith horizontal line (or row) is turned on when a scan signal is supplied to an (i−1)th scan line Si−1 so that the third power source line 190 and the horizontal power source line 170 are electrically coupled to each other. In this case, the voltage of the horizontal power source line 170 may be stably maintained as the second power source ELVDD2 regardless of the initialization power source Vint.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display, comprising:

a scan driver for driving a plurality of scan lines and a plurality of emission control lines, wherein the scan driver is configured to supply a plurality of emission control signals to the emission control lines, and to supply a plurality of inverted emission control signals generated by inverting the emission control signals to a plurality of inverted emission control lines;

a data driver for driving a plurality of data lines;

a display unit including pixels at crossing regions of the scan lines and the data lines;

a plurality of first power source lines coupled to a first power source configured to supply a first voltage and coupled to the pixels in columns;

a plurality of horizontal power source lines extending in a direction parallel with the scan lines and coupled to the pixels in rows;

a second power source line coupled to the horizontal power source lines and coupled to a second power source configured to supply a second voltage equal to the first voltage; and a plurality of first switching elements, each of the first switching elements being coupled between a respective horizontal power source line of the horizontal power source lines and the second power source line, wherein each of the first switching elements are configured to be turned on when a corresponding inverted emission control is supplied to a corresponding one of the inverted emission control lines, wherein each of the pixels comprises:

a driving transistor directly coupled to a corresponding one of the first power source lines and having a gate electrode electrically coupled to a storage capacitor, and wherein each of the pixels is configured to store a third voltage corresponding to the second voltage of the second power source and a data signal voltage supplied by the data driver and is configured to control an amount of current that flows from the first power source in accordance with the third voltage.

2. The organic light emitting display as claimed in claim 1, wherein the scan driver is configured to sequentially supply a plurality of scan signals to the scan lines and to sequentially supply a plurality of emission control signals to the emission control lines.

3. The organic light emitting display as claimed in claim 2, wherein the scan driver is further configured to supply an ith emission control signal of the emission control signals supplied to an ith emission control line of the emission control lines to overlap with a scan signal of the scan signals supplied to an ith scan line of the scan lines.

4. The organic light emitting display as claimed in claim 2, wherein the scan driver is further configured to supply a plurality of inverted emission control signals generated by inverting the emission control signals to a plurality of inverted emission control lines extending in a direction parallel with the emission control lines.

5. The organic light emitting display as claimed in claim 3, wherein each of the pixels in an ith row of the rows comprises:

an organic light emitting diode (OLED);

a pixel circuit for controlling the amount of current supplied to the OLED;

a first transistor coupled between a first node, the first node being a common node between the pixel circuit and the first power source line, and an ith horizontal power source line, the first transistor being configured to be turned off when the emission control signal is supplied to the ith emission control line; and a storage capacitor coupled between the pixel circuit and the ith horizontal power source line.

6. The organic light emitting display as claimed in claim 5, wherein the scan driver is configured to turn off the first transistor in a period where the storage capacitor is charged and to turn on the first transistor in other periods.

7. The organic light emitting display as claimed in claim 5, wherein the pixel circuit comprises:

the driving transistor that is coupled between the first node and the OLED and the gate electrode that is coupled to a first terminal of the storage capacitor; and a fourth transistor coupled between a corresponding data line of the data lines and the first terminal of the storage capacitor and configured to be turned on when the scan signal is supplied to the ith scan line.

8. The organic light emitting display as claimed in claim 1, wherein the scan driver is further configured to turn on a corresponding first switching element of the first switching elements in a period where a storage capacitor included in each of the pixels is charged and is configured to turn off the corresponding first switching element in other periods.

9. The organic light emitting display as claimed in claim 1, wherein the second power source has a lower wiring line resistance than that of the horizontal power source line and that of the first power source line.

10. The organic light emitting display as claimed in claim 1, further comprising at least one third power source line coupled to the second power source and extending in a direction parallel with the data lines.

11. The organic light emitting display as claimed in claim 10, further comprising a plurality of second switching elements, each of the second switching elements being coupled between a corresponding horizontal power source line of the horizontal power source lines and the at least one third power source line.

12. The organic light emitting display as claimed in claim 11, wherein the second switching element of the plurality of second switching elements in an ith row of the rows is configured to be turned on when a corresponding scan signal of the scan signals is supplied to an ith scan line of the scan lines.

13. The organic light emitting display as claimed in claim 11, further comprising a plurality of third switching elements, each of the third switching elements being coupled between a corresponding horizontal power source line of the horizontal power source lines and the third power source line.

14. The organic light emitting display as claimed in claim 13, wherein the third switching element of the plurality of third switching elements in an ith row of the rows is configured to be turned on when a corresponding scan signal of the scan signals is supplied to an (i−1)th scan line of the scan lines.

15. An organic light emitting display, comprising:

a scan driver for driving a plurality of scan lines and a plurality of emission control lines, wherein the scan driver is configured to sequentially supply a plurality of scan signals to the scan lines and to sequentially supply a plurality of emission control signals to the emission control lines, wherein the scan driver is further configured to supply a plurality of inverted emission control signals generated by inverting the emission control signals to a plurality of inverted emission control lines extending in a direction parallel with the emission control lines;

a data driver for driving a plurality of data lines;

a display unit including pixels at crossing regions of the scan lines and the data lines;

a plurality of first power source lines coupled to a first power source configured to supply a first voltage and coupled to the pixels in columns;

a plurality of horizontal power source lines extending in a direction parallel with the scan lines and coupled to the pixels in rows;

a second power source line coupled to the horizontal power source lines and coupled to a second power source configured to supply a second voltage equal to the first voltage; and a plurality of first switching elements, each of the first switching elements being coupled between a respective horizontal power source line of the horizontal power source lines and the second power source line;

wherein each of the pixels comprises a driving transistor directly coupled to a corresponding one of the first power source lines and having a gate electrode electrically coupled to a storage capacitor, and wherein each of the pixels is configured to store a third voltage corresponding to the second voltage of the second power source and a data signal voltage supplied by the data driver and is configured to control an amount of current that flows from the first power source in accordance with the third voltage, wherein a first switching element of the plurality of switching elements in an ith row is configured to be turned on when a corresponding inverted emission control signal of the inverted emission control signals is supplied to an ith inverted emission control line of the inverted emission control lines and is configured to be turned off when the corresponding inverted emission control signal is not supplied to the ith inverted emission control line.

* * * * *